3,476,571
ARTIFICIALLY SWEETENED FRUIT-FLAVORED
PRODUCT
Harry W. Block, East Orange, and Joan M. Adams, Fairview, N.J., and Thomas P. Finucane, Hartsdale, N.Y., assignors to General Foods Corporation, White Plains, N.Y., a corporation of Delaware
No Drawing. Continuation-in-part of application Ser. No. 303,945, Aug. 22, 1963. This application May 19, 1966, Ser. No. 551,244
Int. Cl. A23j 1/06, 1/00, 1/26
U.S. Cl. 99—130                6 Claims

ABSTRACT OF THE DISCLOSURE

A fruit-flavored, dry, powderous, free-flowing edible composition comprising fruit flavor, an organic food acid, and an artificial sweetener which consists of cyclamate, saccharin, mannitol and a bland hydrophilic colloid. The composition is characterized by its desirable tartness, bulk density, and lack of undesirable aftertaste.

---

This application is a continuation-in-part of copending application Ser. No. 303,945, filed Aug. 22, 1963, and now abandoned.

This invention relates to low-calorie sweetened edible products and, more particularly, to a dietetic or sugarless product not having any undesirable aftertaste.

The use of artificial sweeteners as a substitute for sugar to reduce the carbohydrate content in foods is commonplace. The bitter, metallic aftertaste associated with artificial sweeteners has been partially eliminated by combining 1 to 10 parts of cyclamate with 1 part by weight of saccharin. The taste impact from this combination of physiologically acceptable salts of cyclamate and saccharin is much cleaner, pleasant and more free of any undesirable aftertaste. However, this combination of salts has the disadvantage that some residual medicinal taste is still noted in certain food formulations, particularly in dry fruit-flavored beverage and dessert formulations wherein it is attempted to provide a tart flavor by employing an edible food acid such as adipic, citric, malic, tartaric, or fumaric acid therewith. Moreover, in certain formulations when the above salts are mixed in powdered form, the mixture of salts tends to have poor flowability, an excessive amount of fines or dust-like particles and nonuniformity of distribution. To solve these flowability problems, a bulking or granulating agent has been added to the artificial sweeteners. However, this has presented further taste problems on reconstitution and has sometimes led to nondissolving residues in the reconstituted product.

It would be desirable if an artificially sweetened fruit-flavored food formulation employing an edible food acid could be produced which would have increased bulk density and flowability, homogeneity and taste characteristics similar to a naturally sweetened product.

It has now been discovered that a fruit-flavored, dry, powderous, free-flowing edible composition of desirable tartness and free of any undesirable aftertaste can be produced from a composition comprising fruit flavor, an organic food acid, and a sweetener; said sweetener consisting of cyclamate, saccharin, mannitol, and a bland hydrophilic colloid.

The mannitol and bland hydrophilic colloid are preferably combined with the cyclamate and saccharin at levels wherein the artificial sweeteners will achieve a suitable increase in their bulk density. In many fruit-flavored formulations the hydrophilic colloid or thickener such as, for example, gelatin may be a desired ingredient of the formulation and it will merely be necessary to blend the hydrophilic colloid in combination with the mannitol and artificial sweeteners in order to achieve the same taste impact and mouthfeel as that of sugar.

The mannitol used with the artificial sweeteners consists of white, non-hygroscopic crystals obtained from hydrogenation of corn sugar, glucose, etc., or by extraction of manna ash. It is an isomer of sorbitol and has the following structural formula:

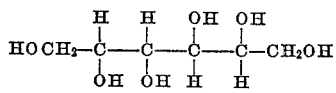

Mannitol may be assimilated in the body without the formulation of sugar and by virtue of its organoleptic properties appears to act in a unique manner to mask any bitter, medicinal, or metallic offtaste associated with artificial sweeteners employed in dry fruit-flavored beverages and fruit-flavored desserts.

The hydrophilic colloid or thickening agent which is to be used with the mannitol-modified artificial sweeteners may be any known edible thickener for use in foods but must be bland or tasteless as well as providing a thicker mouthfeel on ingestion. It appears that the bland thickening agent helps to provide the necessary smoothness, body and mouthfeel associated with a naturally sweetened formulation and decreases the dispersion rate of the artificial sweeteners on the tongue. Among the hydrophilic colloids that may be used to modify the properties of the artificial sweeteners are the following: carboxymethylcellulose, gelatin, pectin, pregelatinized or modified starches having a bland taste, gums such as alginates, carrageenates, gum arabic, guar gum, gum tragacanth, etc.

Among the saccharins which may be used are ordinary saccharin ($C_6H_4COSO_2NH$) and soluble saccharin $C_6H_4COSO_2NNa \cdot 2H_2O$). Among the cyclamate salts which may be used are the sodium and calcium salts of cyclohexylsulfamic acid and mixtures thereof.

The use of mannitol and the hydrophilic colloid blends the taste impact of the cyclamate and saccharin salts to give a more acceptable sweetening effect while at the same time, delaying the dispersion or impact of the artificial sweeteners on the taste buds. In a formulation having fruit flavors, fruit color and a suitable food acid such as adipic, citric, malic, tartaric, or fumaric acid the sweetener of this invention appears to also enhance the desirable tartness of the reconstituted formulation. The tartness impact is particularly evident when the sweetener is combined with adipic acid as the acidulent according to the procedure of Polya, U.S. Patent No. 2,971,848, issued Feb. 14, 1961.

In preparing the formulation of this invention the desired ingredients may be merely dry blended with any conventional fruit-flavored formulation. The usual amount of mannitol added will be 1 to 30 parts, preferably 8 to 20 parts, by weight, for each 1 part of the total weight of the artificial sweeteners, that is, the cyclamate-saccharin combination, and the edible thickener will range in content depending on the thickening effect desired. However, in beverage formulations the level of thickener will usually be 0.8 to 1.2 parts, by weight, for each 1 part of the total weight of the artificial sweeteners. At these ratios the sweetener may be substituted for sugar while obtaining an improved flowability and a desirable organoleptic impact.

The conventional fruit-flavored product which includes the sweetener of this invention may contain any of the ingredients compatible with a fruit-flavored dessert or beverage such as buffer salts, clouding agents, anticaking agents, carbonating agents, acidifying salts, flavors, and color.

When the fruit-flavored product is packaged in a container adapted to provide multiservings of the reconstituted product, and the product does not include a high level of a bland hydrophilic colloid or edible thickener such as gelatin or pectin, it may be desirable to avoid separation of the sweetener from the remaining components and thereby obtain uniformity in product quality at all servings of the product by granulating the artificial sweeteners together with the mannitol and the bland edible thickener. This may be done by known techniques such as mixing the artificial sweeteners, that is, saccharin and cyclamate, mannitol and edible thickener with acetone or other volatile water-soluble solvent and water, the acetone and water being blended in equal parts. About 10 to 30 parts by weight of the water-solvent are used for each 100 parts by weight of dry ingredients. The mixture is mixed until homogeneous and then dried and granulated. Alternatively, the dry ingredients may merely be wet by spraying a small amount of water (5–10%) onto the dry ingredients to thereby form moistened granules which are then dried under mild drying condtions, e.g., 70°–120° F. In still another method the ingredients may be dissolved in excess solvent and/or water, dried and then granulated. The granules of artificial sweeteners, mannitol and edible thickener can then be incorporated in any fruit-flavored dry mix to obtain an easily flowing mixture of improved appearance which does not separate into a nonuniform distribution of ingredients druring subsequent storage.

Aside from the organoleptic properties of the mannitol and bland hydrophilic colloid or edible thickener in masking the bitter or medicinal aftertaste of the artificial sweeteners, the non-hygroscopic character of the mannitol serves to enhance the stability of all the ingredients and inhibits the tendency of the formulation to cake, brown, or degrade due to moisture pick-up from the atmosphere. The relatively large bulk of the mannitol used in the composition enables the formulation to retain stable character despite the use of some hygroscopic ingredients.

This invention will now be described by reference to the following examples:

EXAMPLE I

The sweetener was prepared by dry blending the following ingredients.

| Ingredients: | Parts by wt. |
|---|---|
| Mannitol | 10.0 |
| Gum arabic | 1.1 |
| Sodium cyclamate | 1.0 |
| Sodium saccharin | 0.3 |

The sweetener was then employed in a low-calorie gelatin jelly dessert product of the following formulation.

| Ingredients: | Parts by wt. |
|---|---|
| Sweetener | 39.6 |
| Gelatin | 51.2 |
| Citric acid | 6.0 |
| Trisodium citrate | 1.4 |
| Lemon flavor | 1.0 |
| Color | 0.8 |

About 6–7 grams of the above dry mix was then stirred into 237 ml. (1 cup) of hot (180° F.) water until a clear solution was obtained. The gelatin solution was then allowed to gel and when tasted had a sweet, tart taste with no residual bitter or medicinal aftertaste being discernible in the mouth after ingestion. A control sample employing cyclamate and saccharin at the same levels as above but without the mannitol and gum arabic gave a distinctly bitter, medicinal, and metallic aftertaste when the sample was consumed.

EXAMPLE II

The sweetener of Example I had carboxymethyl cellulose substituted for the gum arabic and was blended well and then sprayed with water to give a granular product having a moisture content of about 5–10%. The moistened granules were then dried in air at a temperature of 110° F. in several minutes. The sweetener was then employed in a low-calorie beverage formulation as follows.

| Ingredients: | Parts by wt. |
|---|---|
| Sweetener | 12.0 |
| Citric acid | 11.2 |
| Trisodium citrate | 2.4 |
| Tricalcium phosphate | 0.8 |
| Orange flavor | 0.1 |
| Color | 0.1 |

A teaspoon of the above beverage formulation was stirred into 6 ounces of chilled water until a clear solution was obtained. The beverage when consumed gave a desirable sweetness and tart orange flavor with no discernible offtastes. The beverage left no residual medicinal or bitter aftertaste on ingestion when compared to a control sample not having the mannitol-carboxymethyl cellulose modifiers. The dry beverage formulation had a desirable bulk density (about one-half that of a naturally sweetened product), and a flowability and appearance similar to a naturally sweetened formulation. The product was stable when stored in moisture-pervious envelopes at an atmospheric temperature of 80° F. and a relative humidity of 40% over a 3–4 month period.

EXAMPLES III AND IV

The procedures of Examples I and II were followed with the exception that adipic acid was used in the formulations instead of citric acid. It was noted on ingestion that the taste of the samples containing adipic acid as the acidulent gave an enhanced tartness and sweetness above that of the Example I and II samples.

EXAMPLE V

The procedure of Example II was followed with the exception that about 1 part of cornstarch was used as a clouding agent. The reconstituted product of this example had the same desirable properties of the Example II formulation with the exception that the beverage resembled the appearance of orange juice more closely.

In addition to the above examples, the sweetener was used in other fruit-flavored beverage and dessert formulations including cherry, grape, strawberry and raspberry with the same desirable results, i.e., increased sweetness and tartness with no residual medicinal aftertaste in the reconstituted product as well as increased flowability, stability, and desirable appearance in the dry form.

A series of tests were also made to determine the organoleptic differences between mannitol, and sorbitol alone and when they were added to and used in the preparation of artificially sweetened fruit-flavored beverage formulations. Eight experienced tasters comprised the panel which judged the samples whose preparation appears in the following examples.

EXAMPLES VI AND VII

Water solutions of mannitol and sorbitol were prepared at the same solids concentration (5%) and judged for sweetness and bitterness by the panel of tasters. The conclusion was that there was no difference in sweetness and very little difference in bitterness between the two samples.

EXAMPLE VIII

Sweetener was prepared by blending the following ingredients.

| Ingredients: | Parts by wt. |
|---|---|
| Mannitol | 10 |
| Sodium cyclamate | 1.0 |
| Sodium saccharin | 0.3 |

The sweetener was employed to prepare a low-calorie orange flavored beverage formulation as follows.

| Ingredients: | Parts by wt. |
|---|---|
| Sweetener | 12.0 |
| Citric acid | 11.2 |
| Trisodium citrate | 2.4 |
| Tricalcium phosphate | 0.8 |
| Orange flavor | 0.1 |
| Color. | |

A teaspoon of the above beverage formulation was stirred into 6 ounces of chilled water until a clear solution was obtained.

EXAMPLE IX

The procedure of Example VIII was followed in all essential respects except that 1.1 parts of sodium carrageenan (Viscarin) was employed as an added ingredient of the sweetener composition.

EXAMPLE X

The procedure of Example VIII was followed in all essential respects except that adipic acid was used in place of citric acid.

EXAMPLE XI

The procedure of Example IX was followed in all essential respects except that adipic acid was used in place of citric acid.

EXAMPLES XII, XIII, XIV and XV

The procedures of Examples VIII, IX, X and XI were essentially followed except that sorbitol was used to replace mannitol.

The consensus of the tasters who evaluated the mannitol-containing samples of Examples VIII through XI was that the beverage was more viscous, more sweet and less bitter when the gum was included in the formula (Example IX versus Example VIII) and that such conclusion was valid regardless of whether the pH of the beverage was 3.5 or 4.0 (Example XI versus Example X). These same findings were also made when sorbitol rather than mannitol was used as the base, that is, comparing the samples of Example XIII versus Example XII and Example XV versus Example XIV.

However, the beverage samples were evaluated as more bitter when sorbitol was added as the base than when mannitol was used (Example XIII versus Example IX). The evaluations were the same regardless of whether the beverage tested was at pH 4.0 or at pH 3.5 (Examples XIII and XV versus Examples IX and XI).

Furthermore, the beverages were considered more bitter at pH 4.0 (with adipic acid) than at pH 3.5 (with citric acid) when they contained sorbitol (Example XV versus Example XIII). This difference in bitterness at the different pH values was less pronounced when mannitol was used as the base (Example XI versus Example IX).

It also appears that pronounced organoleptic differences are noted when a sorbitol-base beverage is compared with a mannitol-base beverage both of which had been prepared with a cyclamate (instead of a cyclamate-saccharin combination) and a bland hydrophilic colloid. The tasters concluded that there was a less pronounced bitterness apparent in the mannitol-base beverage.

While this invention has been described by reference to specific examples, it is understood to be limited only by the scope of the appended claims.

What is claimed is:

1. A fruit-flavored, dry, powderous, free-flowing edible composition of desirable tartness and sweetness which is free of any undesirable aftertaste comprising fruit flavor, an organic food acid and a sweetener, said sweetener consisting of cyclamate, saccharin, mannitol and a bland hydrophilic colloid wherein said cyclamate is present at a level of 1 to 10 parts by weight of said saccharin, said mannitol is present at a level of 1 to 30 parts by weight of said cyclamate and said saccharin, and said bland hydrophilic colloid is present at a level of about 0.8 to 1.2 parts by weight of said cyclamate and said saccharin.

2. The composition of claim 1 wherein the composition is a gelatin dessert formulation.

3. The composition of claim 1 wherein the composition is a beverage formulation.

4. The composition of claim 1 wherein the level of mannitol is 8–20 parts.

5. The composition of claim 1 wherein the bland hydrophilic colloid is carboxymethyl cellulose.

6. The composition of claim 1 wherein the organic food acid is adipic acid.

References Cited

UNITED STATES PATENTS

| 2,629,665 | Gordon | 99—141 |
| 2,761,783 | Ferguson | 99—141 |
| 2,803,551 | Helgreen | 99—141 |
| 2,971,848 | Poyla | 99—141 |
| 3,125,491 | Elowe et al. | 99—141 |

OTHER REFERENCES

Endicott et al., "Artificial Sweetening of Tablets," Drug Cosmetic Industry, August 1959, pp 176–177.

Speel, "Hexitols in the Diabetic Diet," Atlas Powder Company, Wilmington, Del., 2 pp.

RAYMOND N. JONES, Primary Examiner

R. B. ANDEWELT, Assistant Examiner

U.S. Cl. X.R.

99—28, 78, 141